US011953317B2

(12) United States Patent
Taguchi et al.

(10) Patent No.: US 11,953,317 B2
(45) Date of Patent: Apr. 9, 2024

(54) REFERENCE CORE POSITION CALCULATION DEVICE FOR ELEVATOR AND REFERENCE CORE POSITION CALCULATION METHOD

(71) Applicant: Hitachi Building Systems Co., Ltd., Tokyo (JP)

(72) Inventors: Hirofumi Taguchi, Tokyo (JP); Naoaki Noguchi, Tokyo (JP); Daisuke Matsuka, Tokyo (JP); Nobuaki Yagi, Tokyo (JP); Masato Itou, Tokyo (JP)

(73) Assignee: Hitachi Building Systems Co., Ltd., Tokyo (JP)

( * ) Notice: Subject to any disclaimer, the term of this patent is extended or adjusted under 35 U.S.C. 154(b) by 412 days.

(21) Appl. No.: 17/264,124

(22) PCT Filed: Dec. 5, 2019

(86) PCT No.: PCT/JP2019/047659
§ 371 (c)(1),
(2) Date: Jan. 28, 2021

(87) PCT Pub. No.: WO2020/170551
PCT Pub. Date: Aug. 27, 2020

(65) Prior Publication Data
US 2021/0163265 A1 Jun. 3, 2021

(30) Foreign Application Priority Data
Feb. 22, 2019 (JP) .................................. 2019-031087

(51) Int. Cl.
*G01B 21/02* (2006.01)
*G01B 11/00* (2006.01)
(Continued)

(52) U.S. Cl.
CPC ............ *G01B 21/02* (2013.01); *G01B 11/002* (2013.01); *G01B 11/02* (2013.01); *G01B 11/03* (2013.01);
(Continued)

(58) Field of Classification Search
CPC ..... G01B 11/002; G01B 11/02; G01B 11/022; G01B 11/024; G01B 11/026; G01B 11/03;
(Continued)

(56) References Cited

U.S. PATENT DOCUMENTS

2010/0309452 A1* 12/2010 Qiu ........................ G01B 17/00
356/3
2017/0183199 A1* 6/2017 Sambongi .............. G01B 11/14
(Continued)

FOREIGN PATENT DOCUMENTS

CN          204881624 U  * 12/2015
JP          5-278968 A     10/1993
(Continued)

OTHER PUBLICATIONS

Extended European Search Report issued in European Application No. 19915641.5 dated Sep. 21, 2022 (nine (9) pages).
(Continued)

*Primary Examiner* — Gordon J Stock, Jr.
(74) *Attorney, Agent, or Firm* — Crowell & Moring LLP

(57) ABSTRACT

A reference core position calculation device 100 that calculates a reference core position of an elevator shaft in which an elevator is to be installed includes a measurement unit 101 and a calculation unit 112. The measurement unit 101 measures a dimension of each portion of the elevator shaft. The calculation unit 112 calculates portion dimension values of the elevator shaft based on the reference core position and the dimension of each portion measured by the measurement
(Continued)

unit 101. When the reference core position is a first reference core position, the calculation unit 112 determines whether portion dimension values of the elevator shaft calculated based on the first reference core position satisfy a predetermined specification.

8 Claims, 18 Drawing Sheets

(51) Int. Cl.
*G01B 11/02* (2006.01)
*G01B 11/03* (2006.01)
*G01B 11/24* (2006.01)
*G01B 17/06* (2006.01)
*G01B 21/04* (2006.01)

(52) U.S. Cl.
CPC .............. *G01B 11/24* (2013.01); *G01B 17/06* (2013.01); *G01B 21/04* (2013.01)

(58) Field of Classification Search
CPC ....... G01B 11/16; G01B 11/167; G01B 11/22; G01B 11/24; G01B 11/25; G01B 11/2518; G01B 11/26; G01B 17/00; G01B 17/04; G01B 17/06; G01B 17/08; G01B 21/02; G01B 21/04; G01B 21/042; G01B 21/045; G01B 21/047; G01B 21/10; G01B 21/18; G01B 21/20; G01B 21/22; G01B 21/28; G01B 21/30; G01B 21/32

See application file for complete search history.

(56) References Cited

U.S. PATENT DOCUMENTS

| | | | |
|---|---|---|---|
| 2018/0155155 | A1 | 6/2018 | Kawanishi et al. |
| 2018/0172439 | A1 | 6/2018 | Kilpelainen et al. |
| 2021/0325173 | A1* | 10/2021 | Hatano .................. B66B 19/00 |

FOREIGN PATENT DOCUMENTS

| | | | | |
|---|---|---|---|---|
| JP | 6-305658 A | | 11/1994 | |
| JP | H08192966 A | * | 7/1996 | |
| JP | 2001227949 A | * | 8/2001 | ............ B66B 19/00 |
| JP | 2003-66143 A | | 3/2003 | |
| JP | 2004037203 A | * | 2/2004 | |
| JP | 2007-261794 A | | 10/2007 | |
| JP | 2007261794 A | * | 10/2007 | |
| JP | 4411371 B1 | * | 2/2010 | |
| JP | 5497658 B2 | | 5/2014 | |
| JP | 2016060610 A | * | 4/2016 | ............ G01S 17/08 |
| JP | 2018-54346 A | | 4/2018 | |
| JP | 2018054346 A | * | 4/2018 | |
| JP | 6579595 B1 | | 9/2019 | |
| JP | 2019189378 A | * | 10/2019 | ........... B66B 19/002 |
| JP | 2020083639 A | * | 6/2020 | |
| KR | 20170050897 A | * | 5/2017 | |
| WO | WO-2018154774 A1 | * | 8/2018 | ............... B66B 7/00 |

OTHER PUBLICATIONS

International Search Report (PCT/ISA/210) issued in PCT Application No. PCT/JP2019/047659 dated Mar. 3, 2020 with English translation (five (5) pages).

Japanese-language Written Opinion (PCT/ISA/237) issued in PCT Application No. PCT/JP2019/047659 dated Mar. 3, 2020 (four (4) pages).

* cited by examiner

[FIG. 1]
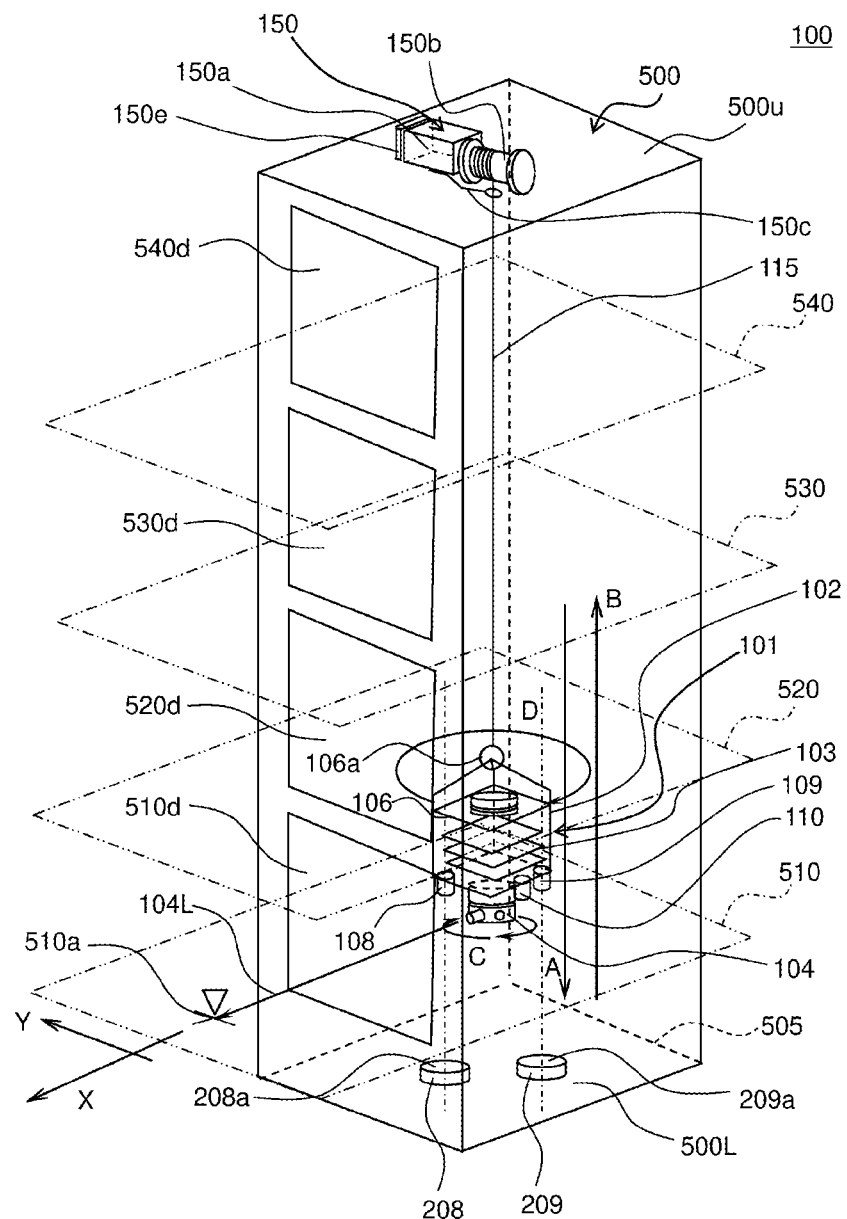

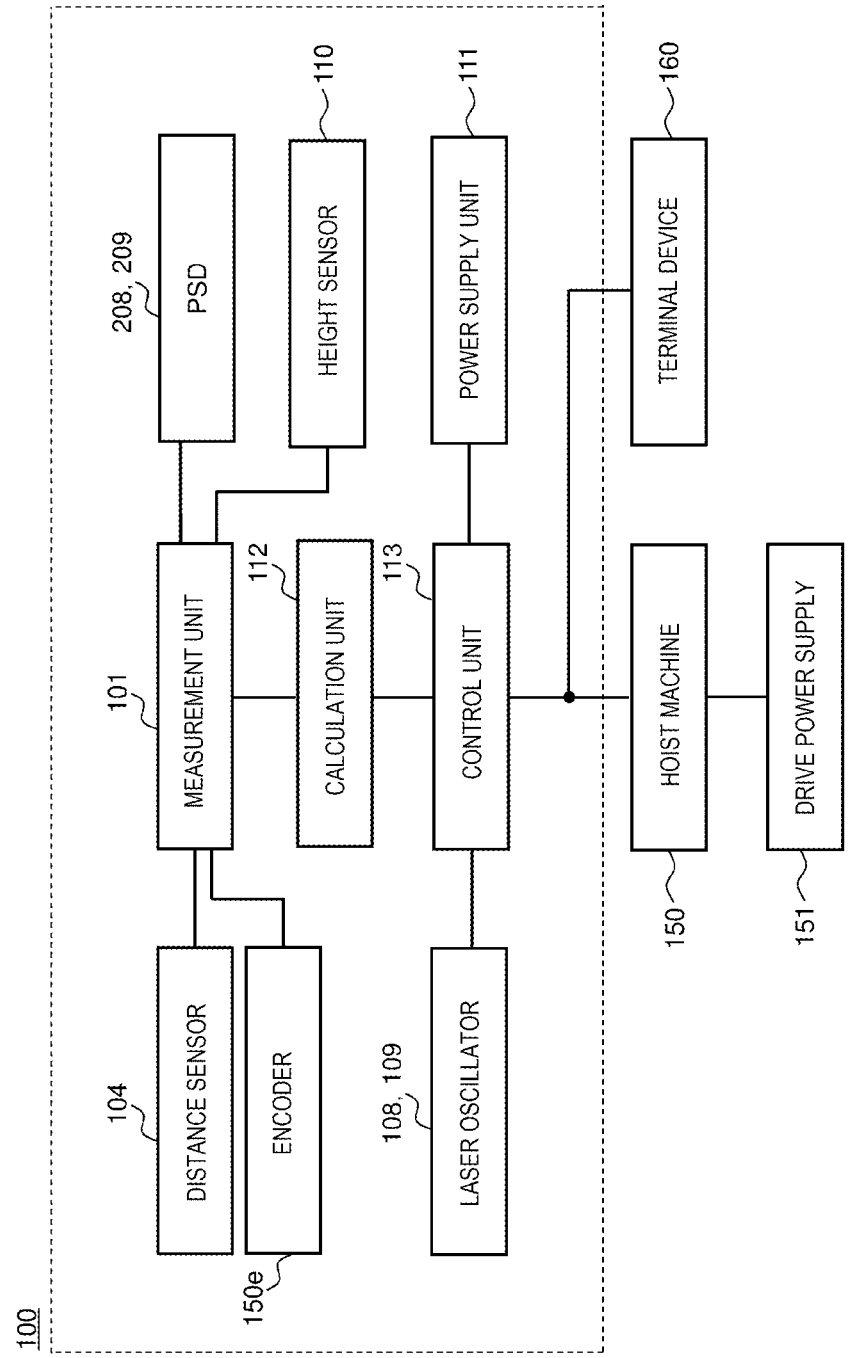
[FIG. 2]

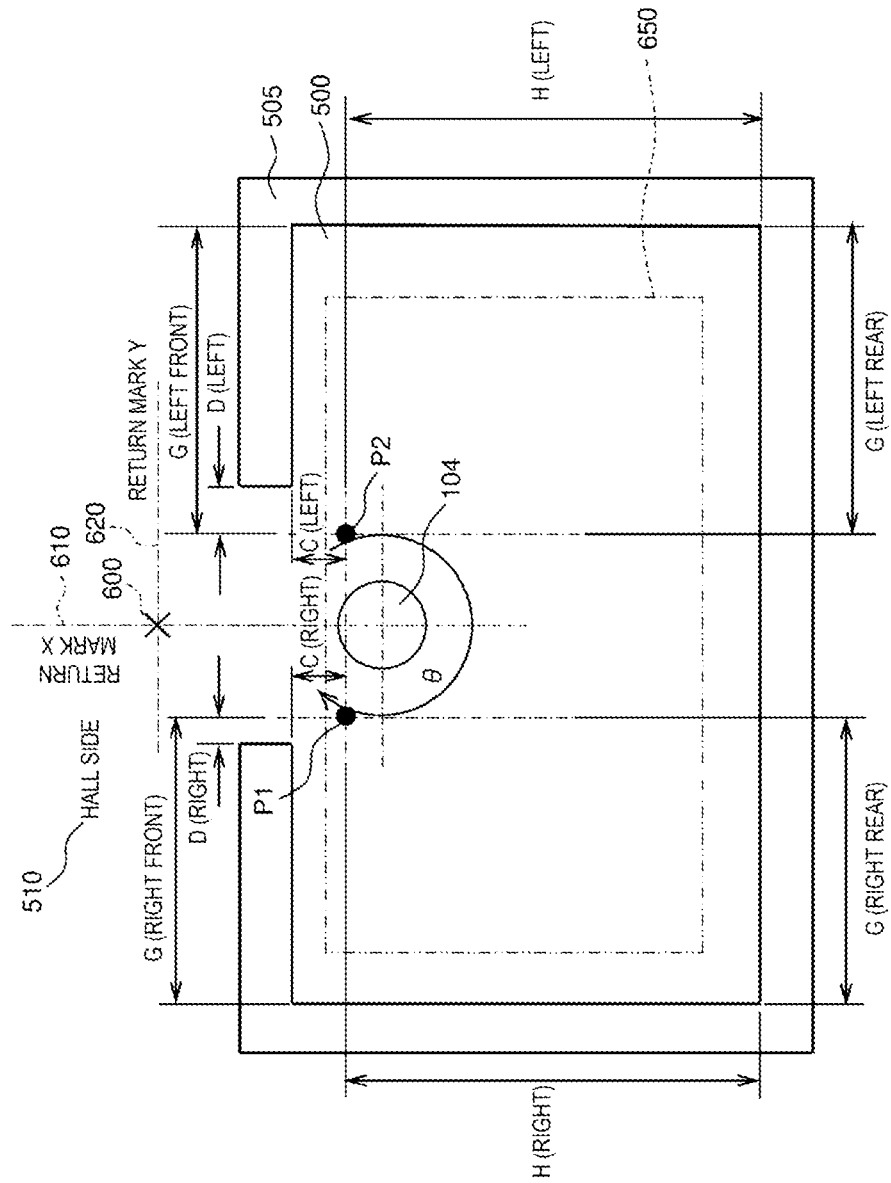
[FIG. 3]

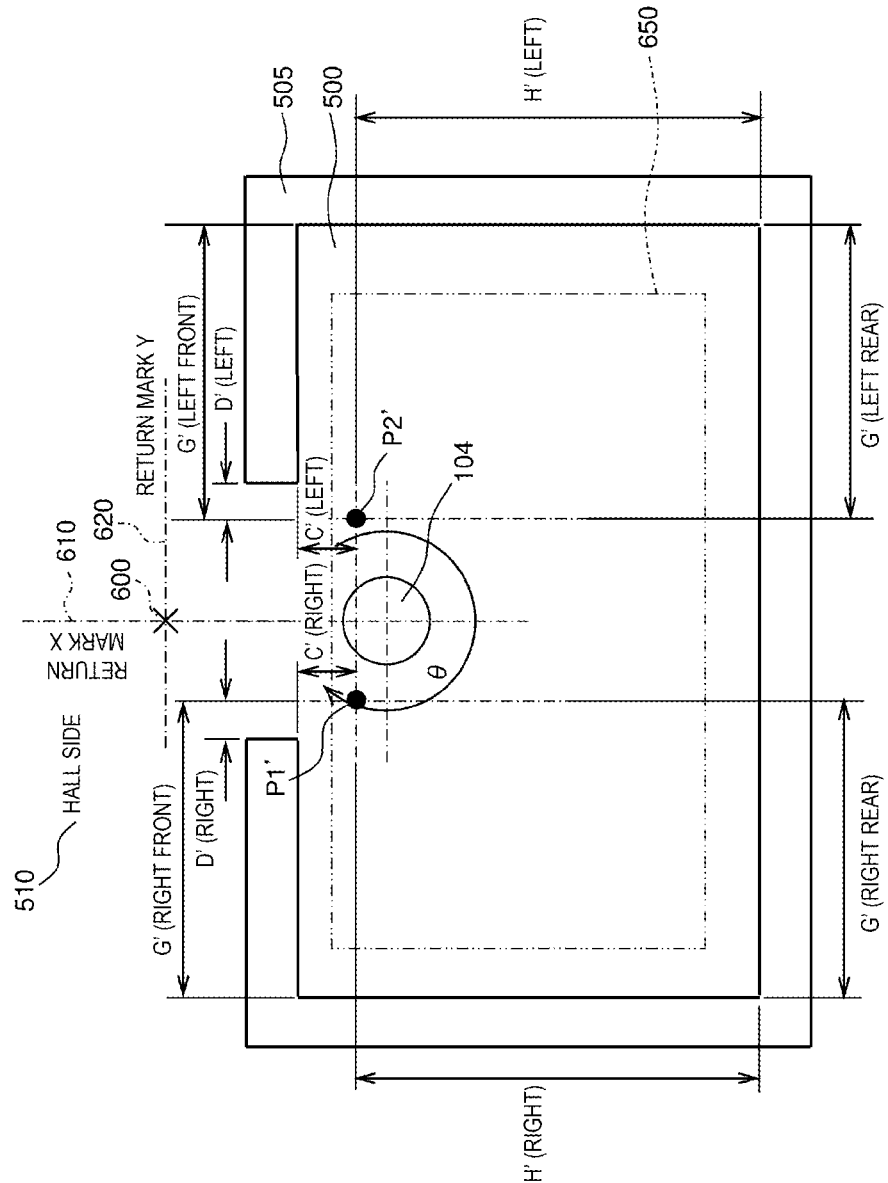
[FIG. 4]

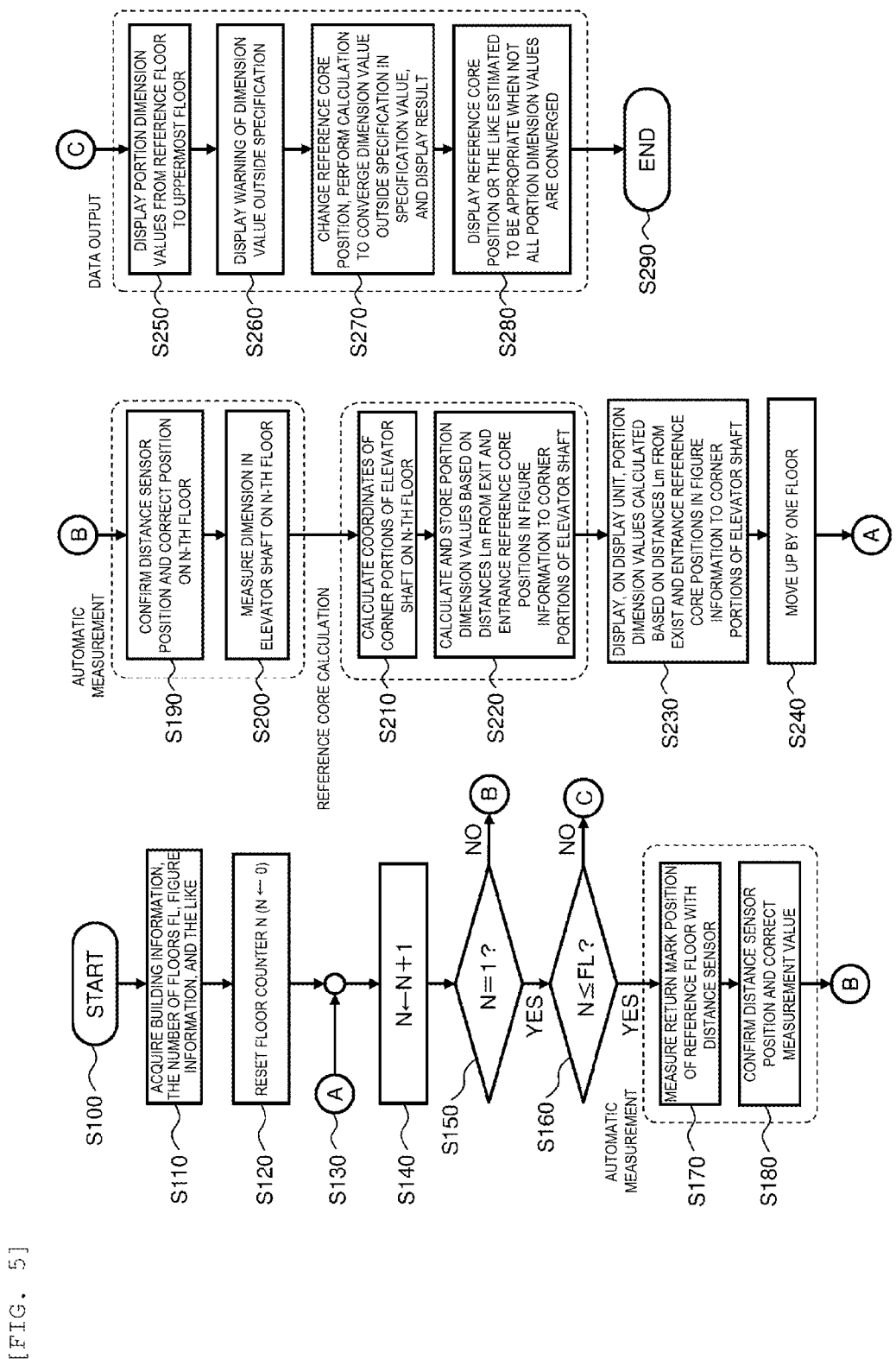
[FIG. 5]

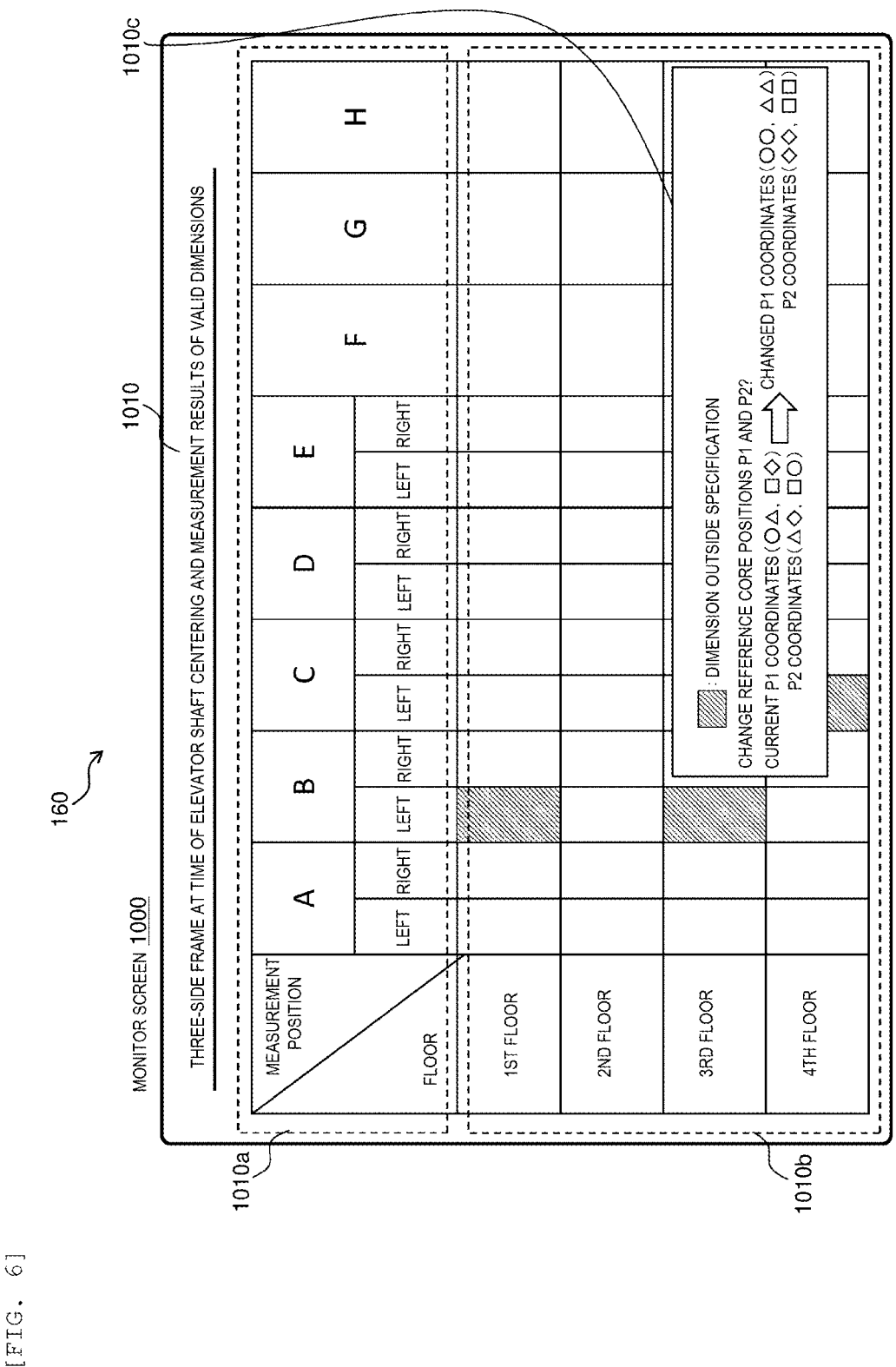
[FIG. 6]

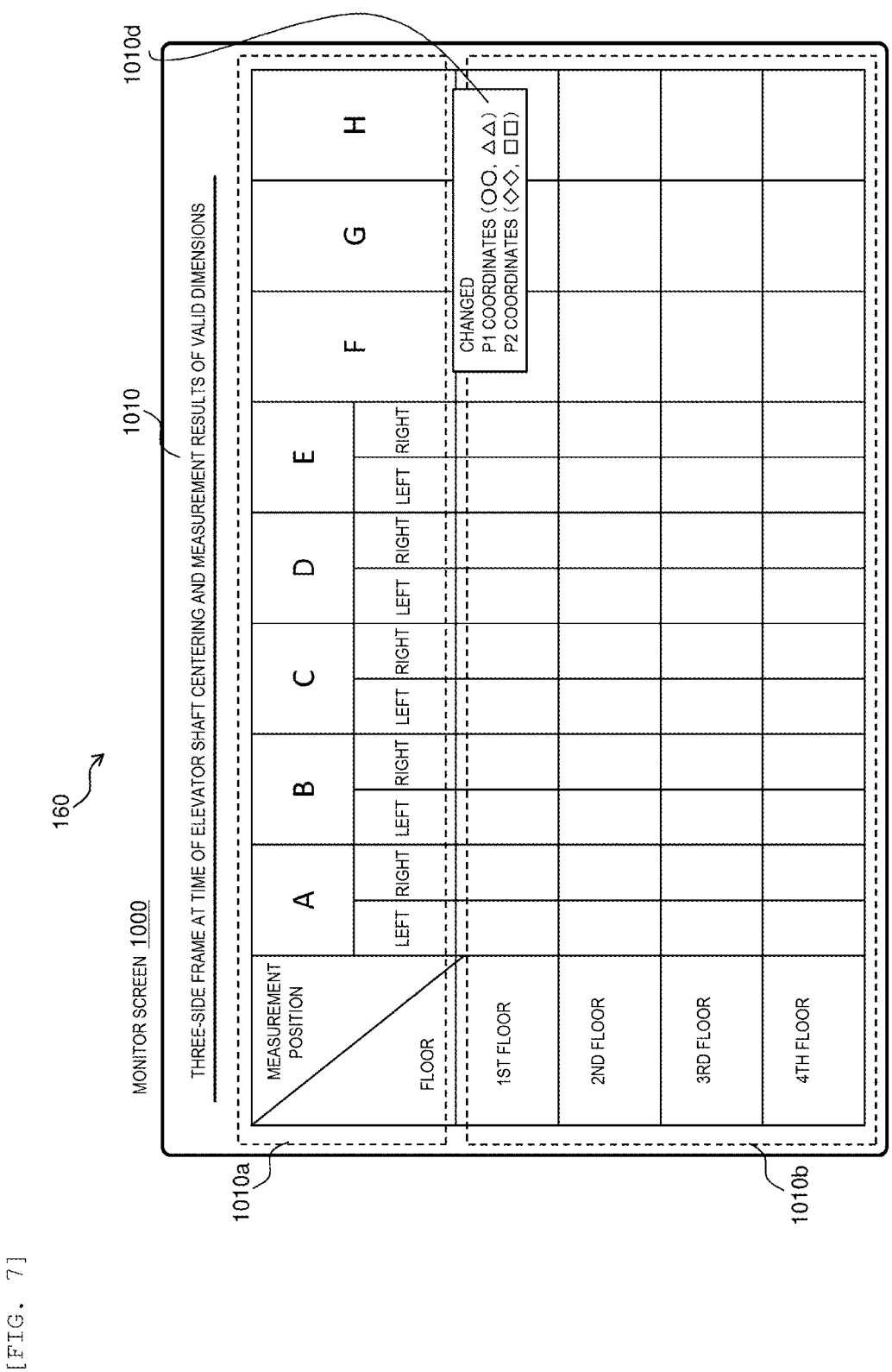
[FIG. 7]

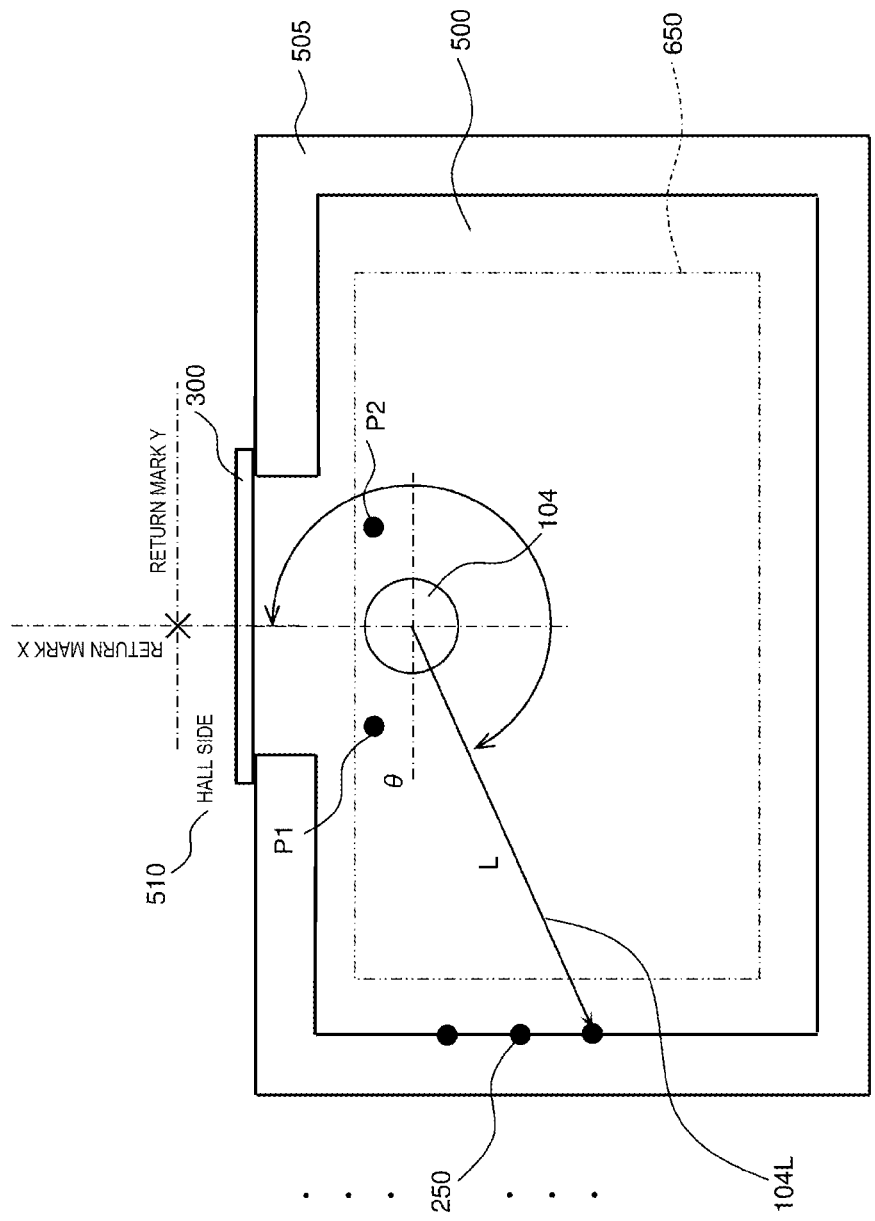
[FIG. 8]

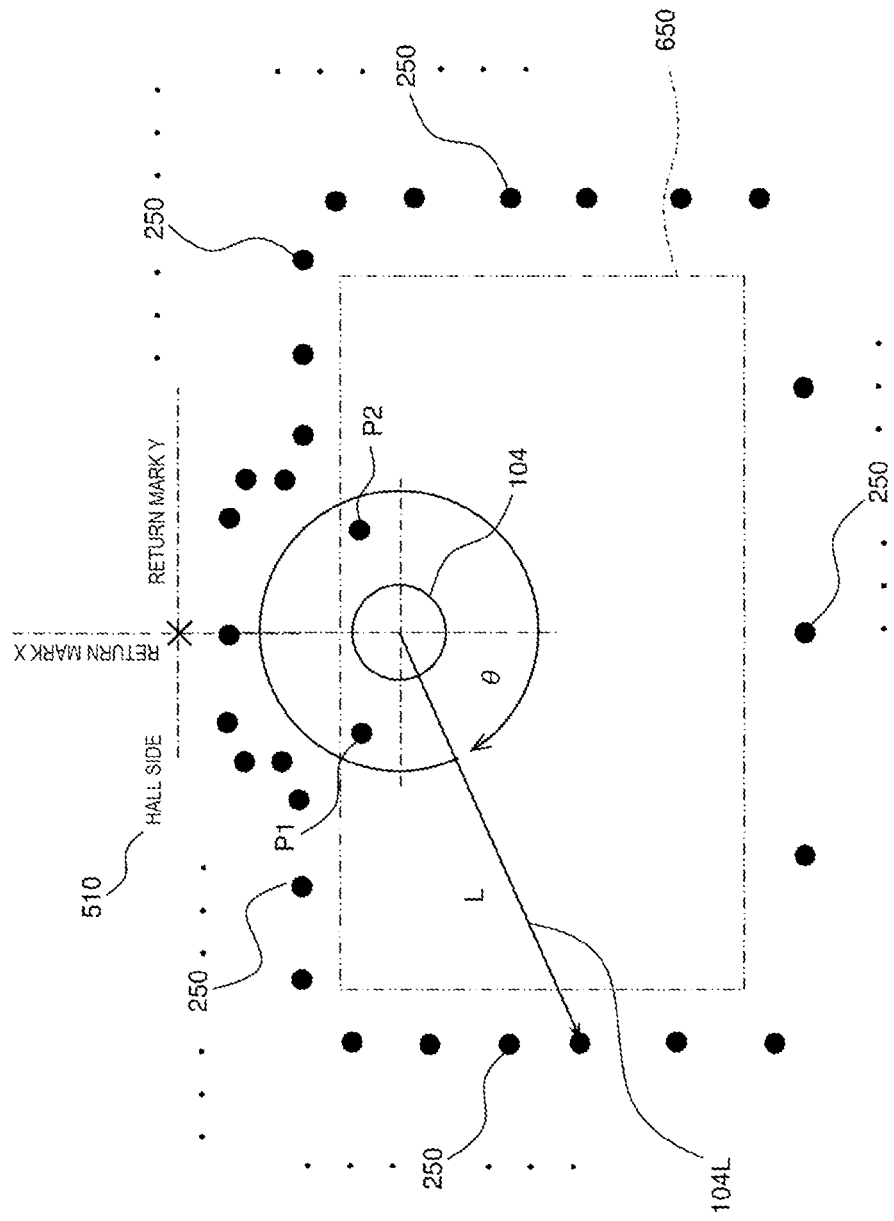
[FIG. 9]

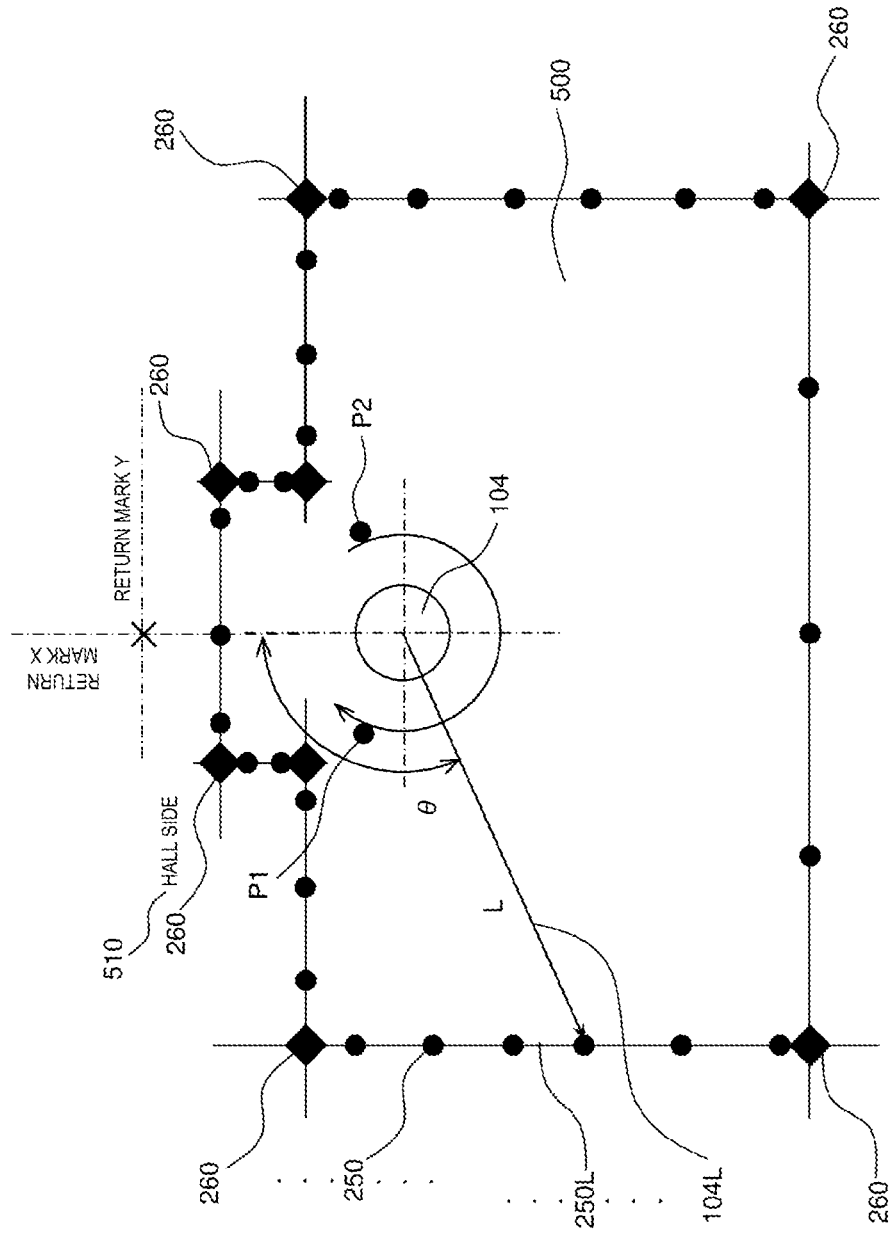
[FIG. 10]

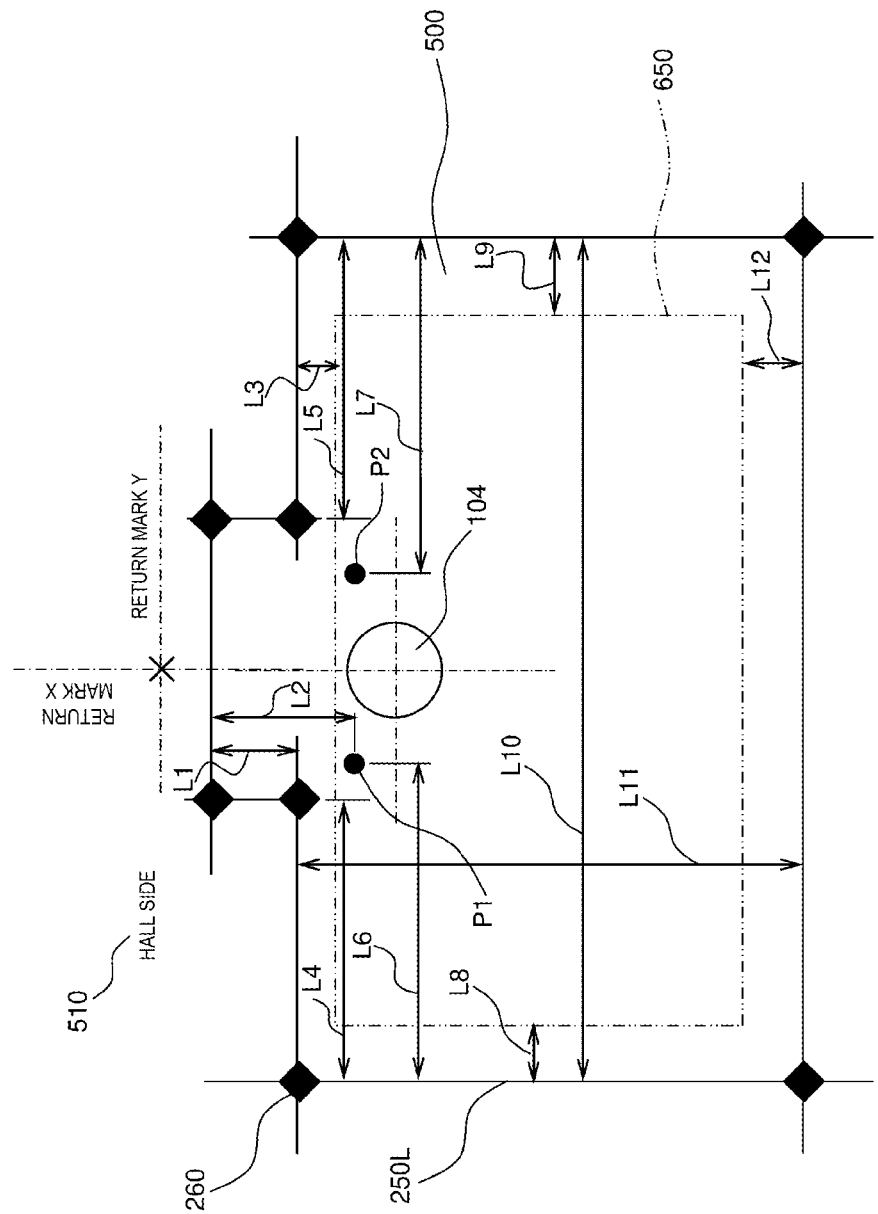
[FIG. 11]

[FIG. 12]
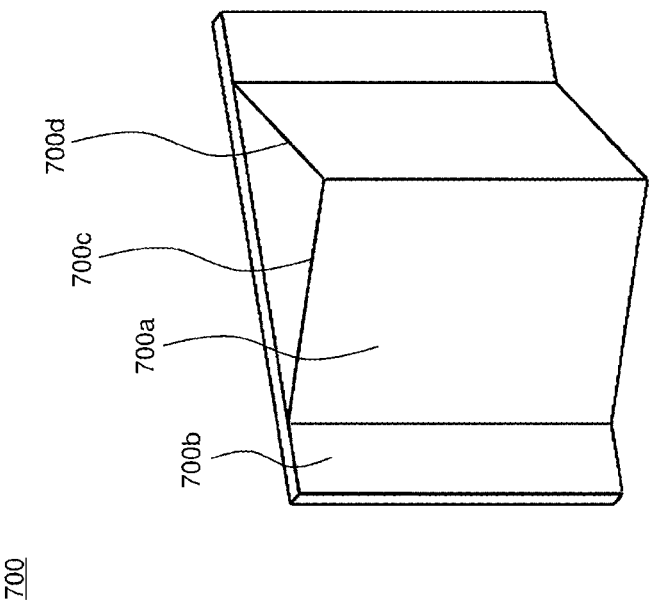

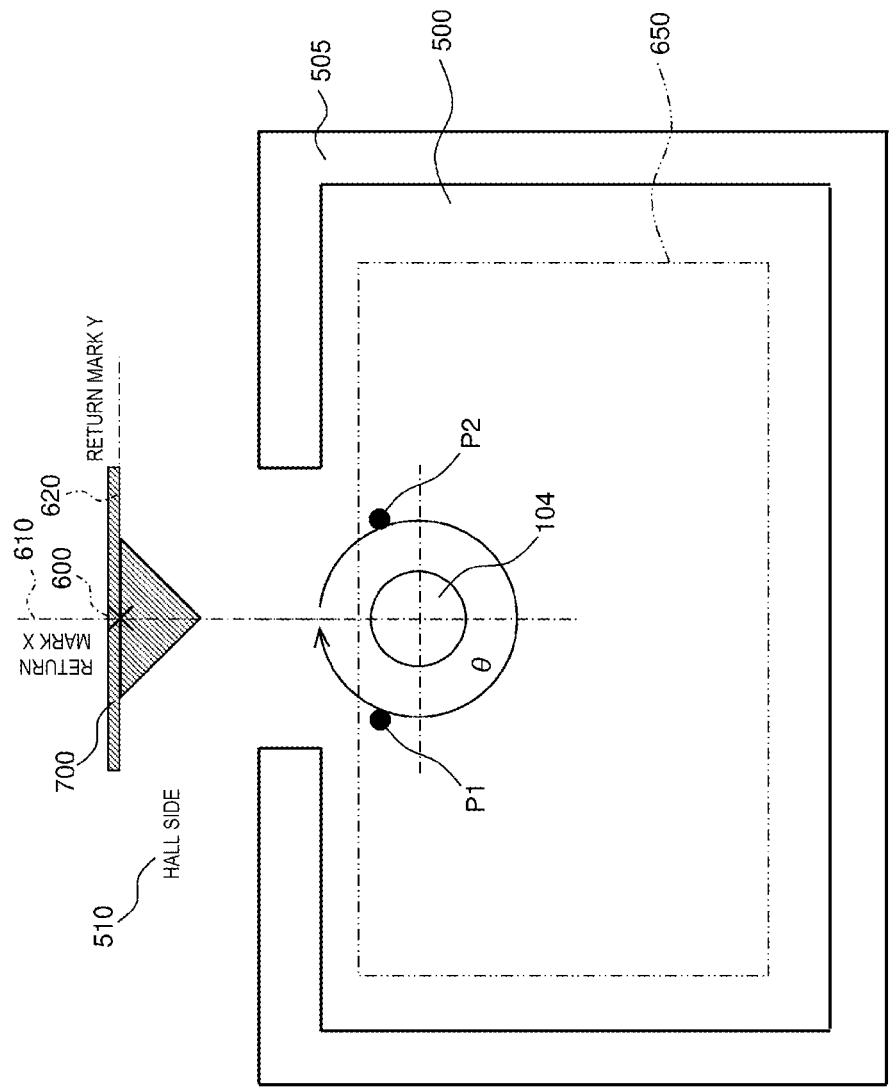
[FIG. 13]

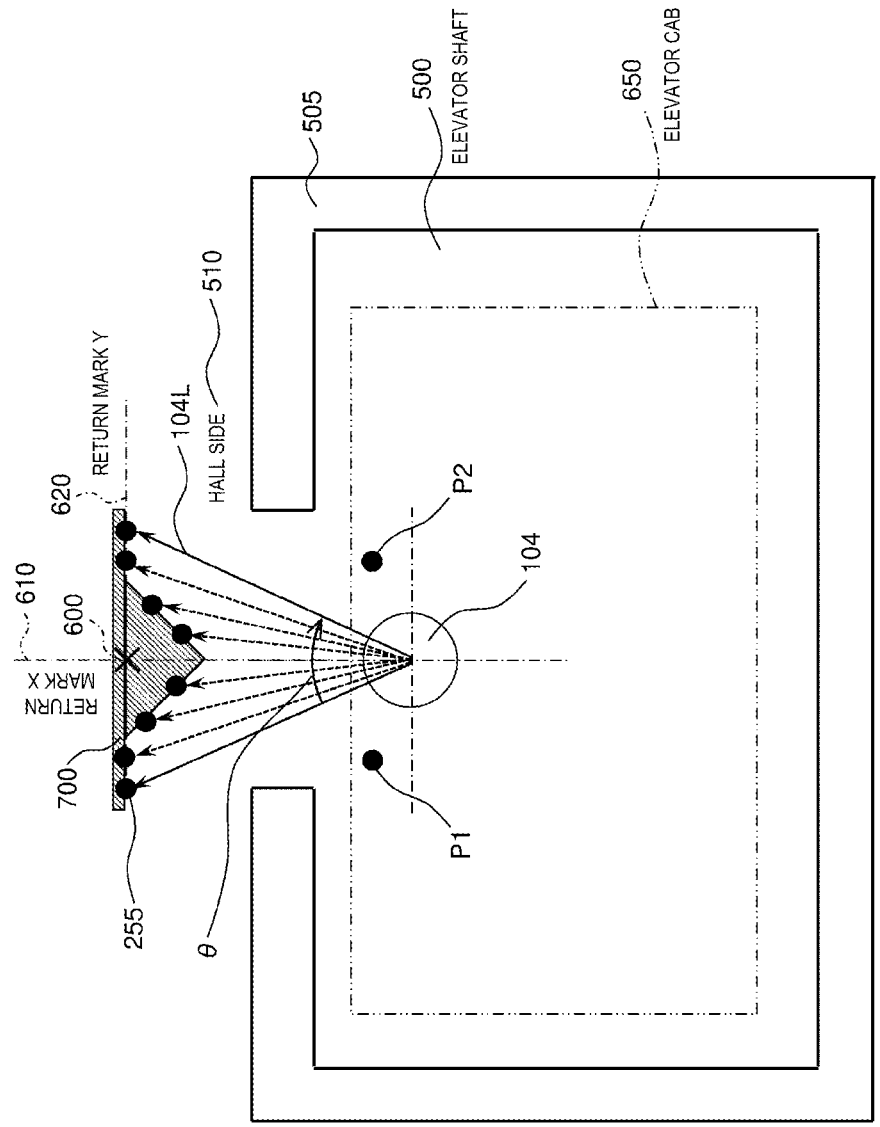
[FIG. 14]

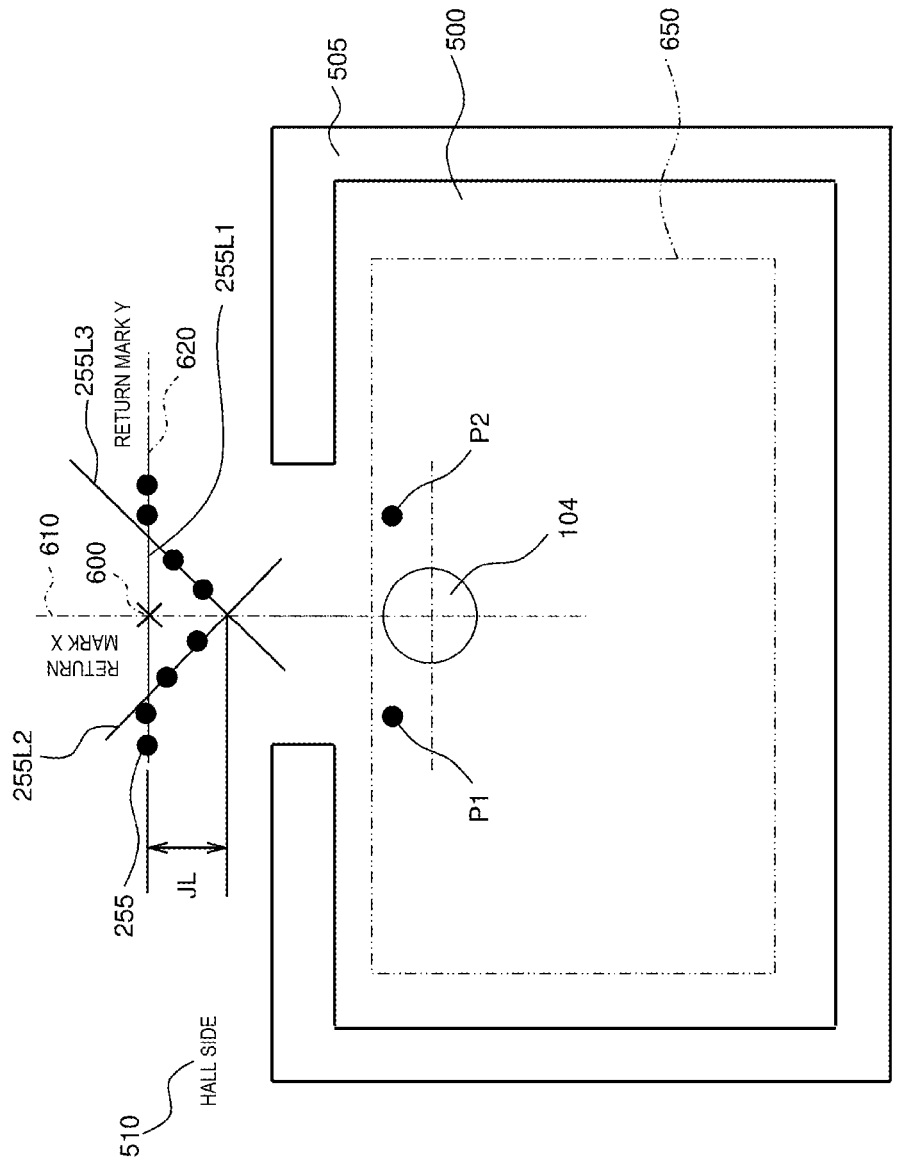

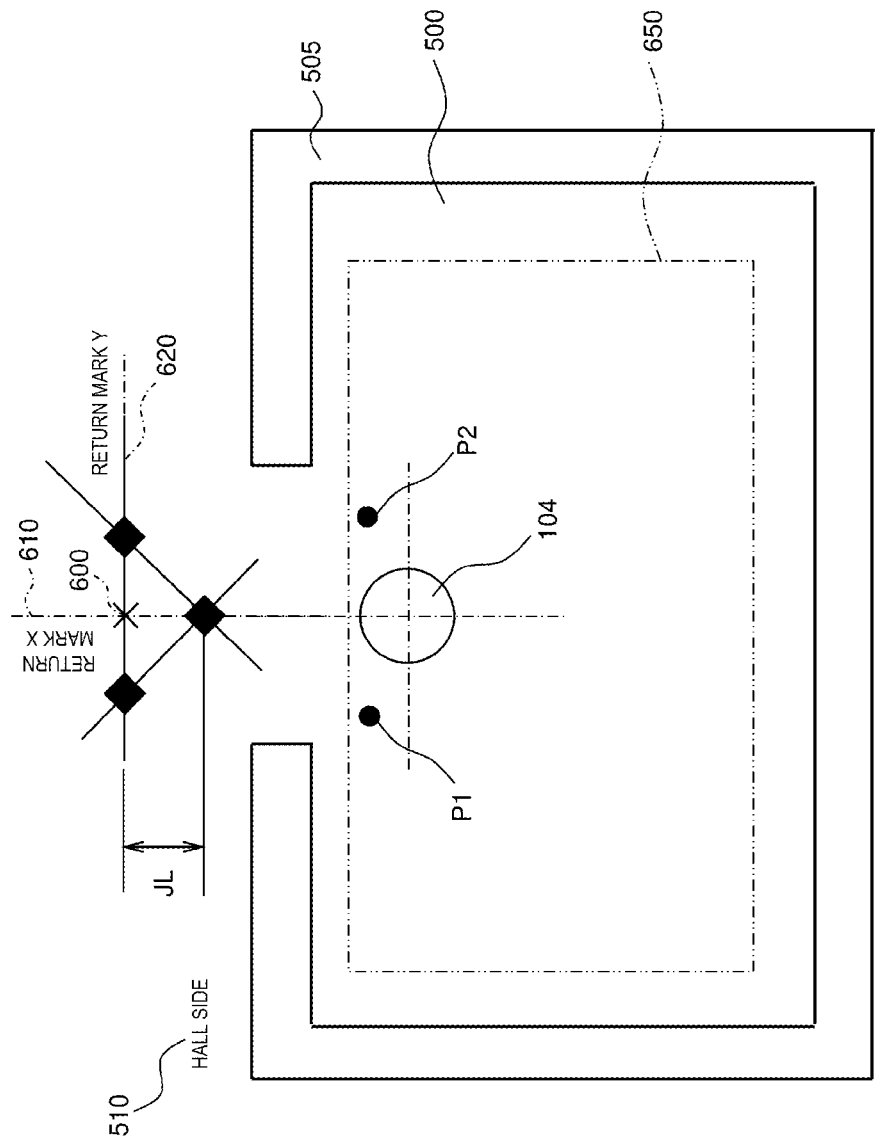
[FIG. 16]

[FIG. 17A]
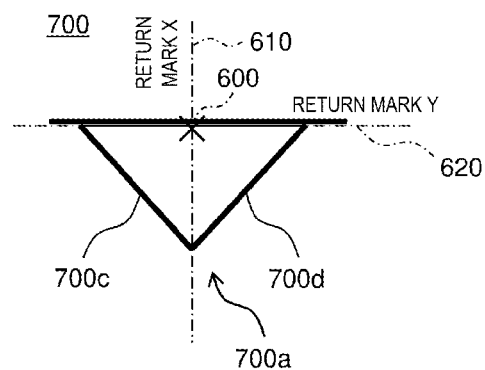
[FIG. 17B]
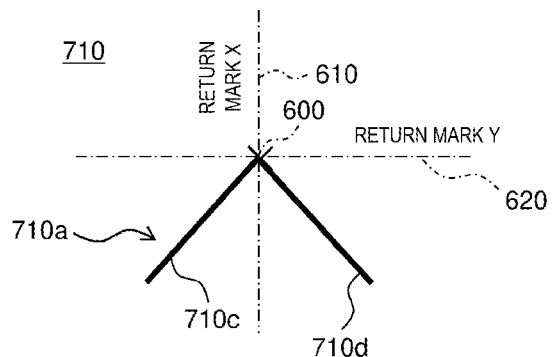

[FIG. 17C]
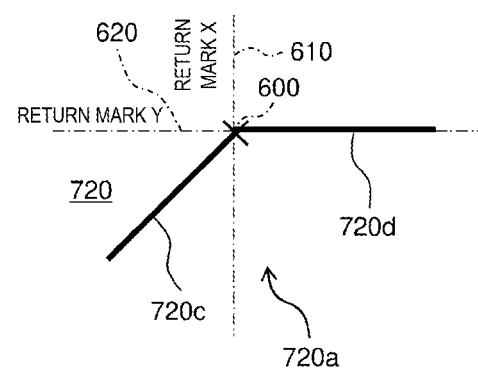

US 11,953,317 B2

REFERENCE CORE POSITION CALCULATION DEVICE FOR ELEVATOR AND REFERENCE CORE POSITION CALCULATION METHOD

TECHNICAL FIELD

The present invention relates to a reference core position calculation device for an elevator and a reference core calculation method.

BACKGROUND ART

An elevator installation work requires skills and is regarded as a work in a 3D (demanding, dirty, and dangerous) environment. In recent years, shortage of installation work technicians has become a major problem in the elevator industry.

The installation work is large, and is performed in an order of an elevator shaft (which may also be referred to as an inside of a tower) reference centering work, a rail centering and fixing work, an exit and entrance installation work, elevator cab assembly, and a test run and adjustment work. Here, the elevator shaft reference centering work is a work for determining a main position and dimensions serving as a reference for elevator installation, which particularly requires skills. The elevator shaft reference centering work is a main work that will affect elevator installation accuracy and finally affect comfort when taking an elevator if the work is carelessly performed.

Here, for dimension measurement in the elevator shaft related to reference centering, for example, PTL 1 discloses that "distances in both a horizontal direction and a vertical direction can be safely, easily, and automatically measured in a spiral manner by one laser range finder provided on an elevator cab while the elevator cab is normally operated without taking an elevator out of service" as a method for measuring the elevator shaft during an elevator renewal work which is an invention related to automation technology that reduces work loads and does not necessarily require skills.

As a method for measuring an elevator shaft during a new installation work of an elevator (hereinafter, referred to as a new installation work), for example, PTL 2 discloses that "measuring a distance in a horizontal direction that is substantially perpendicular to a longitudinal direction with a transport machine that moves in a structure body in the longitudinal direction and a distance sensor connected to the transport machine".

CITATION LIST

Patent Literature

PTL 1: JP-A-2003-66143
PTL 2: Japanese Patent No. 5497658

SUMMARY OF INVENTION

Technical Problem

However, the related arts described above do not disclose specific matters related to a process of determining a reference core position of the elevator shaft that is necessary in a new elevator installation work.

In order to automatically measure a dimension of an elevator shaft, for example, PTL 1 discloses a technique for providing, on the elevator cab (hereinafter, referred to as a cab), the laser range finder that measures a distance up to an object and a motor that causes the laser range finder to scan the object with a laser beam, and spirally measuring dimensions in the elevator shaft by scanning the object with the laser light when the cab moves up and down. That is, PTL 1 discloses a method for measuring the elevator shaft assuming that a renewal work such as elevator repair is performed.

PTL 2 discloses a technique for measuring the distance in the horizontal direction that is substantially perpendicular to the longitudinal direction with the transport machine that moves in the structure body in the longitudinal direction and the distance sensor connected to the transport machine.

Here, when a new elevator is to be installed, it is necessary to determine a "reference core" position in an elevator shaft during installation of a rail and determine an exit and entrance position and a rail position.

However, as described above, PTL 1 discloses automatic measurement in an elevator shaft targeting on a renewal work when a repair work or the like is performed, but does not disclose determination of a "reference core position". PTL does not disclose "determination of a reference core position" of the elevator shaft which is a necessary work in a new installation work. Therefore, the related arts described above cannot automatically measure a reference core position necessary in installation of an elevator in an elevator shaft.

The invention has been made in view of the above circumstances, and aims to automatically measure a reference core position necessary in installation of an evaporator in an elevator shaft.

Solution to Problem

In order to solve the problems described above, the invention provides a reference core position calculation device that calculates a reference core position of an elevator shaft in which an elevator is to be installed. The reference core position calculation device includes a measurement unit that measures a dimension of each portion in the elevator shaft, and a calculation unit that calculates portion dimension values of the elevator shaft based on the reference core position and the dimension of each portion measured by the measurement unit. When the reference core position is a first reference core position, the calculation unit determines whether portion dimension values of the elevator shaft calculated based on the first reference core position satisfy a predetermined specification.

Advantageous Effect

According to the invention, a reference core position necessary in elevator installation in an elevator shaft can be automatically measured.

BRIEF DESCRIPTION OF DRAWINGS

FIG. 1 is a diagram showing a configuration example of a reference core position calculation device for an elevator shaft.

FIG. 2 is a block diagram showing a configuration example of the reference core position calculation device for the elevator shaft.

FIG. 3 is a diagram showing an example of a reference centering procedure of the reference core position calculation device for the elevator shaft.

FIG. 4 is a diagram showing an example of the reference centering procedure of the reference core position calculation device for the elevator shaft.

FIG. 5 is a diagram showing an example of an operation processing flow of the reference core position calculation device for the elevator shaft.

FIG. 6 is a diagram showing a display example of the reference core position calculation device for the elevator shaft.

FIG. 7 is a diagram showing a display example of the reference core position calculation device for an elevator shaft.

FIG. 8 is a diagram showing an example of dimension measurement and dimension value calculation in the reference core position calculation device for the elevator shaft.

FIG. 9 is a diagram showing an example of dimension measurement and dimension value calculation in the reference core position calculation device for the elevator shaft.

FIG. 10 is a diagram showing an example of dimension measurement and dimension value calculation in the reference core position calculation device for the elevator shaft.

FIG. 11 is a diagram showing an example of dimension measurement and dimension value calculation in the reference core position calculation device for the elevator shaft.

FIG. 12 is a perspective view showing an example of a return mark position jig used when a return mark position is automatically recognized and measured in the reference core position calculation device for the elevator shaft.

FIG. 13 is a diagram showing an example of automatically recognizing and measuring a return mark position in the reference core position calculation device for the elevator shaft.

FIG. 14 is a diagram showing an example of automatically recognizing and measuring a return mark position in the reference core position calculation device for the elevator shaft.

FIG. 15 is a diagram showing an example of automatically recognizing and measuring a return mark position in the reference core position calculation device for the elevator shaft.

FIG. 16 is a diagram showing an example of automatically recognizing and measuring a return mark position in the reference core position calculation device for the elevator shaft.

FIG. 17A is a plan view showing a return mark position jig according to an embodiment used when a return mark position is automatically recognized and measured in the reference core position calculation device for the elevator shaft.

FIG. 17B is a plan view showing a return mark position jig according to a first modification used when a return mark position is automatically recognized and measured in the reference core position calculation device for the elevator shaft.

FIG. 17C is a plan view showing a return mark position jig according to a second modification used when a return mark position is automatically recognized and measured in the reference core position calculation device for the elevator shaft.

DESCRIPTION OF EMBODIMENTS

Hereinafter, embodiments of the invention will be described in detail with reference to drawings. Each of the drawings in the present specification shows an example. In the present specification, the same reference numerals in the drawings denote the same or similar configurations or processings. Only a difference between a previous embodiment and a subsequent embodiment will be described, and description of a subsequent embodiment may be omitted. A part of or all of the embodiments and modifications can be combined within a scope of the technical idea of the invention and within an integration scope.

Embodiment

<Configuration of Reference Core Position Calculation Device>

FIG. 1 is a diagram showing a configuration example of a reference core position calculation device for an elevator shaft. FIG. 1 is a schematic perspective view showing a reference core position calculation device 100 applied to an elevator shaft 500 for elevator installation according to an embodiment. Although an example of a building having four floors is described in the present embodiment, the invention is not limited to application to a building having four floors, and may be applied to a building having two or more floors.

The reference core position calculation device 100 includes a measurement unit 101, a device housing 102 of the measurement unit 101, a substrate 103 on which a calculation processing device (not shown) that performs calculation and control of the reference core position calculation device 100 is mounted, and a measurement distance sensor 104. Here, an example of the distance sensor 104 includes a laser scanning distance sensor. The distance sensor 104 can measure a distance up to an object to be measured by a laser beam emitted from the distance sensor 104.

The reference core position calculation device 100 further includes a suspension hook 106, a ring portion 106a of the suspension hook 106, and a rope 115. The suspension hook 106 is integrally attached to the device housing 102. The ring portion 106a is provided at a tip end of the suspension hook 106, and is engaged with an end portion of the rope 115.

A hoist machine 150 is attached in the vicinity of an elevator shaft top portion 500u. The hoist machine 150 includes a hoist drive unit 150a, a hoist drum 150b, a rope guide 150c for guiding the rope 115 to hang vertically downward in a predetermined position in a drum width of the hoist drum 150b, and an encoder 150e that detects the number of rotations of the hoist drum 150b.

In the present embodiment, an example of the encoder 150e includes a rotary encoder. Based on output information from the rotary encoder, rotation information such as the number of rotations and a rotational speed of the hoist drum 150b can be detected, and a length of the rope gradually released from the hoist drum 150b can be determined. The reference core position calculation device 100 can also detect, by the encoder 150e, which height position of the elevator shaft 500 the measurement unit 101 is in based on the determined rope length. Here, lifting or lowering the reference core position calculation device 100 in the elevator shaft 500 is performed by the hoist machine 150 winding up or gradually releasing the rope 115 that suspends the reference core position calculation device 100.

As described above, the distance sensor 104 attached to the reference core position calculation device 100 is, for example, a scanning laser sensor. The distance sensor 104 emits a laser beam 104L and the laser beam hits an object to be measured. The distance sensor 104 detects a reflected beam of the laser beam to output a distance up to the object to be measured. Here, since the distance sensor 104 can be rotated in a direction indicated by an arrow C in FIG. 1, the distance sensor 104 can measure distances to an inner wall of the elevator shaft 500 in a horizontal cross section of the elevator shaft 500. The distance sensor 104 is not limited to a sensor using the laser beam 104L, and may be a sensor using light or sound.

FIG. 1 shows a first floor surface 510, a second floor surface 520, a third floor surface 530, and a fourth floor surface 540 of an elevator. A first floor exit and entrance opening 510d is provided on the first floor surface 510 of the elevator shaft 500. Similarly, a second exit and entrance opening 520d, a third exit and entrance opening 530d, and a fourth exit and entrance opening 540d are respectively provided on the second floor surface 520, the third floor surface 530, and the fourth floor surface 540 of the elevator shaft 500. FIG. 1 shows a reference return mark 510a that is scribed in advance on the first floor surface 510 which is a reference floor.

The reference core position calculation device 100 includes laser oscillators 108 and 109 that detect a position of the reference core position calculation device 100 in a horizontal direction at a bottom surface end portion of the device housing 102. Position sensitive detectors (PSD) 208 and 209 that detect positions of laser beams 108a and 109a emitted from the laser oscillators 108 and 109 are provided on an elevator shaft bottom surface 500L of a pit of the elevator shaft 500.

The reference core position calculation device 100 further includes a laser height sensor 110 that measures a distance from a bottom surface side of the device housing 102 down to the elevator shaft bottom surface 500L. Since radiation positions (not shown) of the laser beams 108a and 109a on light receiving surfaces of PSDs 208 and 209 are changed when the reference core position calculation device 100 swings due to an influence of wind or the like blown in the elevator shaft 500, it is possible to obtain information on how much the reference core position calculation device 100 is shifted from a vertical position in a situation in which no swing or the like occurs based on shift amounts of the radiation positions and distance information of the height sensor 110.

FIG. 1 shows the return mark 510a serving as a reference position on a building reference floor (typically the first floor). An installation position of a rail for regulating a cab when an elevator moves up and down and an installation position of an exit and entrance door are determined based on a position of the return mark 510a. Generally, the return mark 510a is also used as a reference position for another floor based on the return mark of the reference floor (the first floor in most cases).

Distance measurement by the reference core position calculation device 100 is started from measurement of the position of the return mark 510a. Measurement of the return mark 510a of the first floor serving as a reference position is generally performed in an initial stage.

<Functional Configuration of Reference Core Position Calculation Device>

FIG. 2 is a block diagram showing a functional configuration example of the reference core position calculation device for the elevator shaft. As shown in FIG. 2, the reference core position calculation device 100 includes the measurement unit 101, the distance sensor 104, the laser oscillators 108 and 109, the height sensor 110, a power supply unit 111, a calculation unit 112, a control unit 113, and the PSDs 208 and 209. Each of the measurement unit 101, the calculation unit 112, and the control unit 113 is a calculation processing device such as a microcomputer.

The distance sensor 104 includes a rotary unit on a horizontal surface, and measures a distance to an inner wall or the like of the elevator shaft 500 at each angle position of rotation with respect to a reference angle. The laser oscillators 108 and 109 detect a planar position of the reference core position calculation device 100. The height sensor 110 detects a height of the reference core position calculation device 100 in a lifting and lowering direction. The power supply unit 111 is a battery or an external power supply, and supplies drive power to the reference core position calculation device 100.

The calculation unit 112 is a calculation processing device such as a microcomputer, and calculates distance components of the elevator shaft in an X direction and a Y direction (see FIG. 1) based on the distance measured by the distance sensor 104 and an angle position at the time of measurement. The calculation unit 112 also performs an OK determination and an NG determination for a reference core position to be described later, and further performs a calculation to change the reference core position so that portion dimension values of the elevator shaft 500 is within a specification. The control unit 113 collectively controls a measurement operation, a lifting and lowering operation, measurement result display, or the like of the entire reference core position calculation device 100.

As shown in FIG. 2, the hoist machine 150, a drive power supply 151 that supplies power to the hoist machine 150, and a terminal device 160 are connected to the reference core position calculation device 100. The terminal device 160 is a personal computer, a slate terminal such as a tablet and a smart phone, a personal digital assistant (PDA), or the like that is capable of displaying a list of portion dimension values from a reference core position in the elevator shaft 500 to be described later. The portion dimension values are calculated based on a measured distance and angle information. The terminal device 160 is connected to the reference core position calculation device 100 so that wired or wireless communication can be performed.

<Reference Centering Procedure>

FIGS. 3 and 4 are diagrams showing a reference centering procedure of the reference core position calculation device for the elevator shaft. FIGS. 3 and 4 show a cross section of the elevator shaft 500. When the elevator shaft 500, an elevator shaft wall 505, the floor surface 510 in front of the elevator, and a return mark position 600 (the same as the return mark 510a) serving as an installation origin are positioned as shown in FIGS. 3 and 4, an axis in which a vertically upper side passing through the return mark position 600 is a positive direction is defined as an X axis 610 and an axis in which a horizontal left side passing through the return mark position 600 is a positive direction is defined as a Y axis 620.

When a work is to be performed in an elevator, a right direction and a left direction are typically defined by viewing an elevator shaft 500 side from a hall side on the floor surface 510. In the present embodiment, a right direction and a left direction are also defined according to the above-described definition.

Here, "D (right)" shown in FIG. 3 is a distance from a right reference core position P1 to a front side wall of the elevator shaft 500. "G (right front)" is a distance from the reference core position P1 to a corner where a front side wall and a vertical wall of the elevator shaft 500 intersect in a Y direction. "C (right)" is a distance from the reference core position P1 to the front side wall. "H (right)" is a distance from the reference core position P1 to a rear side wall. "G (right rear)" is a distance from the reference core position P1 to a corner where a rear wall and the vertical wall of the elevator shaft 500 intersect in the Y direction. "D (left)", "G (left front)", "C (left)", "H (left)", and "G (left rear)" shown in FIG. 3 are terms obtained by substituting "right" in "D (right)", "G (right front)", "C (right)", "H (right)", and "G (right rear)" with "left", and indicate a part of portion dimension values calculated based on a reference core position P2 located at a left side as viewed from a floor surface 510 side. "G (right front)", "G (left front)", "G (right rear)", and "G (left rear)" are distances measured in a case in which a three-side frame (not shown) is provided.

FIG. 4 shows a part of portion dimension values when the reference core positions P1 and P2 are intentionally shifted to reference core positions P1' and P2'.

For an actual elevator installation work, in a manual reference centering work in the related art, based on figure information, two piano wires (not shown) hang, with respect to the return mark position 600 shown in FIG. 4, from the elevator shaft top portion 500u toward the known right side reference core position P1 and the left side reference core position P2 that are design values. Next, feet of the two piano wires coincide with the reference core positions P1 and P2 on the reference floor. Then, distances from piano wire positions to portions of the elevator shaft are measured by a convex, a straightedge, or a curved ruler on each floor and are recorded. After the measurement work is repeated from the first floor to an uppermost floor, it is confirmed whether recorded dimension values converge in a predetermined specification and are proper dimensions. Here, when a part of the dimensions does not converge in the specification, the reference core positions P1 and P2 are intentionally moved to the reference core positions P1' and P2', or a part of the elevator shaft wall 505 is removed so as to converge the part of the dimensions in predetermined dimensions. This work needs to be performed when an elevator installation work technician negotiates with a building customer, and is a work that requires skills.

In this manner, in the manual reference centering work in the related art, the work technician measures a distance using a convex, a straightedge, or a curved ruler. In contrast, in the present embodiment, the distance sensor 104 emits the laser beam 104L to a measurement object, measures time by using a reflected beam of the laser beam 104L, and measures a distance by applying triangulation. In the present embodiment, the distance sensor 104 is mounted on a rotary stage (not shown), and measures a distance while the rotary stage is rotated, so that the distance sensor 104 can measure any distance by performing scanning in the elevator shaft 500.

<Operation of Reference Core Position Calculation Device>

FIG. 5 is a diagram showing an operation processing flow of the reference core position calculation device for the elevator shaft. The reference core position calculation device 100 receives an operation from the work technician and starts a processing (step S100). First, in step S110, the reference core position calculation device 100 acquires the number of floors (FL) of the elevator shaft 500, an allowable tolerance of a dimension of each portion, and figure information such as reference core position information taking a return mark position as a reference (an origin). A method of setting the acquired information may be inputting the information in the reference core position calculation device 100 by the work technician, or downloading the information automatically from CAD data of the elevator shaft 500 to the reference core position calculation device 100. For example, first, the reference core position calculation device 100 may be moved up and down in the elevator shaft 500 and the number of exits and entrances is counted to set the number of floors (FL).

Next, in step S120, the reference core position calculation device 100 resets a counter N indicating a floor number to 0. Next, in step S140, the reference core position calculation device 100 increments the counter N by +1 and prepares for measurement of an N-th floor. Next, in step S150, the reference core position calculation device 100 determines whether N=1. When N=1 (YES in step S150), the reference core position calculation device 100 proceeds the processing to step S160. On the other hand, when N>1 (NO in step S150), the reference core position calculation device 100 proceeds the processing to step S190.

In step S160, the reference core position calculation device 100 determines whether the counter N is equal to or less than a total number of floors FL. When N≤FL (YES in step S160), the reference core position calculation device 100 proceeds the processing to step S170. On the other hand, when N>FL (NO in step S160), the reference core position calculation device 100 proceeds the processing to step S250.

When N=1 (YES in step S150) and N≤FL (YES in step S160), the reference core position calculation device 100 performs measurement for the first floor. First, the return mark position 600 shown on the floor surface 510 needs to be measured in advance. Therefore, in step S170, the reference core position calculation device 100 measures the return mark position 600 using the distance sensor 104. The return mark position 600 may be input based on the figure information.

Next, in step S180, the reference core position calculation device 100 confirms a horizontal position of the distance sensor 104 using the laser oscillators 108 and 109, and corrects a measurement value of the return mark position of the reference floor measured in step S170 based on changes in positions on the light receiving surface of the PSDs 208 and 209. Steps S170 and S180 are setting processings unique to the reference floor.

Next, in step S190, the reference core position calculation device 100 corrects a position of the measurement unit 101 in the same manner as in step S170 for the counter N incremented by +1 in step S140. Next, in step S200, the reference core position calculation device 100 measures a dimension of each portion of the elevator shaft 500 on the N-th floor.

Next, in step S210, the reference core position calculation device 100 performs smoothing for measurement results in step S200, performs first-order approximation for data in a straight line portion, and calculates coordinates of corner portions of the elevator shaft 500. A method for calculating the coordinates of the corner portions will be described in detail later. Next, in step S220, the reference core position calculation device 100 calculates distances Lm (m is a positive integer indicating an index) from the reference core positions P1 and P2 in the figure information to the corner portions of the elevator shaft 500, calculates portion dimension values based on the distances Lm, and stores the portion dimension values in a predetermined storage area.

Here, the distances Lm refer to, for example, L1 to L12 to be described later with reference to FIG. 11. The portion dimension values calculated based on the distances Lm refers to portion dimension values necessary in elevator installation, such as "measurement positions" "A (left)", "A (right)", "B (left)" . . . "G", and "H" as shown in, for example, FIGS. 6 and 7. The portion dimension values calculated based on the distances Lm are the distances Lm, or are calculation results based on the distances Lm.

In FIGS. 6 and 7, numerical values displayed on display cells corresponding to "floors" and "measurement positions" are omitted.

Next, in step S230, the reference core position calculation device 100 further displays, on the terminal device 160, distances from the reference core positions P1 and P2 to corners of the elevator shaft, that is, portion dimensions necessary in elevator installation, on a floor basis. Then, when acquisition of measurement data on a floor basis is completed in steps S190 to S230, in step S240, the reference core position calculation device 100 moves the measurement unit 101 up by one floor using the hoist machine 150.

Subsequent to step S240, the processing returns to step S130 and step S140, the reference core position calculation device 100 increments the counter N by +1. The reference core position calculation device 100 repeats processings of incrementing the counter N by +1 instep S140, NO in step S150, and processings in steps S190 to S240 until N>FL (NO in step S160).

When measurement for all floors is completed and N>FL (NO in step S160), in step S250, the reference core position calculation device 100 displays, on the terminal device 160, the portion dimension values (for example, main dimension values) that are measured and calculated from the reference floor (the first floor) to the uppermost floor and are calculated based on the distances Lm from the reference core positions P1 and P2. Here, in step S260, the reference core position calculation device 100 determines whether the portion dimension values satisfy a specification based on reference information or the like input in step S110. For a portion dimension value outside the specification, the reference core position calculation device 100 displays a warning to identify the portion dimension value outside the specification from other dimension values in a corresponding display portion (a display cell) as shown in the example in FIG. 6. In the example in FIG. 6, a hatched display cell corresponds to a warning display.

Next, in step S270, in order to converge the dimension value outside the specification in a specification value, the reference core position calculation device 100 outputs a warning to manually change the reference core positions P1 and P2, or automatically change coordinates of the reference core positions P1 and P2 relative to the return mark position 600. In the example in FIG. 6, in step S270, the reference core position calculation device 100 displays the reference core positions P1' and P2' before and after a change on a reference core position change content display 1010c. Further, in an example in FIG. 7, in step S270, the reference core position calculation device 100 displays, as a changed reference core position display 1010d, portion dimension values based on new and changed reference core positions P1' and P2' on the terminal device 160 again.

For example, the work technician may appropriately manually shift coordinate positions of the reference core positions P1 and P2 to coordinate positions of the reference core positions P1' and P2' corresponding to a warning output of manually changing the coordinate positions of the reference core positions P1 and P2. Alternatively, for example, the calculation unit 112 of the reference core position calculation device 100 may automatically calculate the coordinate positions of the reference core positions P1 and P2 so as to change the coordinate positions of the reference core positions P1 and P2 to the coordinate positions of the reference core positions P1' and P2', so that a sum of errors of the distances Lm from the reference core positions P1 and P2 from the reference floor to the uppermost floor is minimum. Alternatively, the calculation unit 112 of the reference core position calculation device 100 may automatically calculate the coordinate positions of the reference core positions P1 and P2 so as to change the coordinate positions of the reference core positions P1 and P2 to the coordinate positions of the reference core positions P1' and P2', so that an error is preferentially reduced from a distance Lm having a high importance degree among the distances Lm. As a result, finally, all portion dimension values calculated based on the distances Lm are converged in specification values, and a warning display of a dimension value outside the specification is canceled as shown in FIG. 7.

Next, in step S280, when not all portion dimension values on all floors are converged in specification values, the reference core position calculation device 100 displays, on the terminal device 160, distances Lm based on which a corresponding portion dimension value cannot be converged in a specification value, and reference core positions P1' and P2' that are estimated to be appropriate positions in a case in which a corresponding portion dimension value is not converged in a specification value, and portion dimension values at the reference core positions P1' and P2'. When the processing in step S280 is completed, the reference core position calculation device 100 ends a series of measurement and reference centering work processings (step S290). Here, the reference core positions P1' and P2' may be set so that a worker can intentionally change and input a reference core position.

<Display Example in Reference Core Position Calculation Device>

FIGS. 6 and 7 are diagrams showing display examples in the reference core position calculation device for the elevator shaft. FIGS. 6 and 7 are diagrams showing a list of portion dimension values that are measurement and calculation results and are necessary in elevator installation.

As shown in FIGS. 6 and 7, the terminal device 160 includes a monitor screen 1000. The monitor screen 1000 includes a display area 1010 for displaying portion dimension values obtained by measuring and calculating dimensions of the elevator shaft 500. The display area 1010 is a GUI or the like. The display area 1010 includes a display area 1010a for displaying portion dimension values and specifications of the portion dimension values, and a display area 1010b for displaying measurement and calculation results of the portion dimension values.

An elevator work technician negotiates with a building customer to confirm whether there is a problem in an elevator installation work with reference to the table shown in the display area 1010.

Although not shown, "-" may be displayed in a display cell in FIGS. 6 and 7, which refers to that a corresponding item in the display cell is an item that does not necessarily require measurement or calculation.

A hatched display cell in FIG. 6 displays a value indicating that a measurement and calculation result, a portion dimension value, is not within a specification, that is, a dimension error. When one or a plurality of portion dimension values calculated based on the distances Lm from the reference core positions P1 and P2 are not converged in a predetermined dimension tolerance, as shown in FIG. 6, a corresponding display cell is hatched in a red background color or the like to warn the work technician, and the work technician can recognize that it is necessary to shift the reference core positions P1 and P2 to appropriate positions.

The terminal device 160 includes a touch panel and other input devices in addition to the monitor screen 1000. The work technician can change and input a portion dimension value displayed in a display cell by touching a portion of a display cell, or operating an input device such as a keyboard and a mouse.

<Dimension Measurement and Dimension Value Calculation>

FIGS. 8 to 11 are diagrams showing examples of dimension measurement and dimension value calculation in the reference core position calculation device for the elevator shaft. FIGS. 8 to 11 show cross sections of the elevator shaft 500. In FIGS. 8 to 11, an elevator cab 650 accommodated in the elevator shaft 500 and surrounded by the elevator shaft wall 505 is indicated by a two-dot chain line. A plate 300 contact-fixed to the elevator shaft wall 505 closes a space between two font side walls of the elevator shaft 500 from the hall side of the floor surface 510. The laser beam 104L emitted from the distance sensor 104 is used to measure, at a plurality of measurement points 250, a distance from a measurement center of the distance sensor 104 to an inner wall of the elevator shaft wall 505. The plate 300 is not necessarily a continuous plate, and may be provided at two ends in contact with at least the two front side walls of the elevator shaft 500.

The distance sensor 140 measures a distance L from the measurement center to the elevator shaft wall 505 while being rotated continuously or stepwisely by controlling an angle θ around a rotation center of the distance sensor 140. An X axis direction distance and a Y axis direction distance to the center of the distance sensor 104 can be calculated by converting the distance L into a return mark X direction (X axis) component and a return mark Y direction (Y axis) component based on the distance L and the angle θ during measurement.

FIG. 9 shows a state in which the distance sensor 104 is rotated by 360° around the center of the distance sensor 104, and measures the inner wall of the elevator shaft wall 505 over a round. Similarly, a plurality of measurement points obtained by measurement are indicated by the measurement points 250.

In FIG. 10, each side of the elevator shaft wall 505 in FIG. 9 is approximated by a primary straight line 250L, and each intersection point 260 at each corner portion is indicated by a rhombus ♦. FIG. 11 shows the distances Lm (m is a positive integer indicating an index) indicated by double-ended arrows. Calculation results of the portion dimension values based on the distances Lm are automatically loaded into the tables as shown in FIGS. 6 and 7.

<Automatic Recognition and Measurement of Return Mark Position>

FIG. 12 is a perspective view showing an example of a return mark position jig used when a return mark position is automatically recognized and measured in the reference core position calculation device for the elevator shaft. FIGS. 13 to 17 are diagrams showing examples of automatically recognizing and measuring a return mark position in the reference core position calculation device for the elevator shaft.

As shown in FIG. 12, a return mark position jig 700 includes a top portion 700a and a flat surface portion 700b. The top portion 700a has a triangular prism shape formed of two inclined surfaces that face each other and form an intersection line (a ridge). When viewed from an upper side, one of the two inclined surfaces has a ridgeline 700c and the other inclined surface has a ridgeline 700d in the top portion 700a.

FIG. 13 shows a diagram of providing the return mark position jig 700 at the return mark position 600 at the hall side of the elevator shaft 500. FIG. 14 shows a state in which the distance sensor 104 is rotated while changing the angle θ around the center of the distance sensor 104, and performs scanning to measure distances to the return mark position jig 700. As shown in FIG. 14, a distance from the measurement center of the distance sensor 104 to the return mark position jig 700 is measured at a plurality of measurement points 255 using the laser beam 104L.

FIG. 15 is a diagram showing the measurement points 255 measured using the return mark position jig 700. Similar to the measurement of a distance to the inner wall of the elevator shaft wall 505, FIG. 15 shows a state in which straight line portions from the measurement points 255 are approximated to draw approximate straight lines 255L1, 255L2, and 255L3. FIG. 16 shows a diagram in which each of three intersection points of the approximate straight lines 255L1, 255L2, and 255L3 shown in FIG. 15 is indicated by a rhombus ♦. Here, a distance JL in FIGS. 15 and 16 is known as a dimension of the return mark position jig 700. Therefore, the return mark position 600 that cannot be directly measured by the laser beam 104L can be estimated based on the distance JL.

<Modification of Return Mark Position Jig>

Modifications of the return mark position jig will be described with reference to FIGS. 17A to 17C. FIG. 17A is a plan view showing the return mark position jig according to the present embodiment used when the return mark position is automatically recognized and measured in the reference core position calculation device for the elevator shaft. FIG. 17B is a plan view showing a return mark position jig according to a first modification used when a return mark position is automatically recognized and measured in the reference core position calculation device for the elevator shaft. FIG. 17C is a plan view showing a return mark position jig according to a second modification used when a return mark position is automatically recognized and measured in the reference core position calculation device for the elevator shaft. A return mark position jig 710 shown in FIG. 17B according to the first modification and a return mark position jig 720 shown in FIG. 17C according to the second modification will be described in comparison with the return mark position jig 700 shown in FIG. 17A according to the present embodiment.

When viewed from an upper side, the return mark position jig 710 according to the first modification includes a top portion 710a having ridgelines 710c and 710d as shown in FIG. 17B. The top portion 710a corresponds to the top portion 700a of the return mark position jig 700. As can be seen from a comparison between FIGS. 17A and 17B, the return mark position jig 710 only includes the top portion 710a without a flat surface portion, and an intersection point of the ridgeline 710c and the ridgeline 710d is at the return mark position 600.

When viewed from an upper side, the return mark position jig 720 according to the second modification includes a top portion 720a having ridgelines 720c and 720d as shown in FIG. 17C. The top portion 720a corresponds to the top portion 700a of the return mark position jig 700. As can be seen from a comparison between FIGS. 17A and 17C, the return mark position jig 720 only includes the top portion 720a without a flat surface portion, and an intersection point of the ridgeline 720c and the ridgeline 720d is at the return mark position 600.

The return mark position 600 can be estimated by measuring a distance to a surface on a jig by the distance sensor 104 with any one of the return mark position jig 710 according to the first modification and the return mark position jig 720 according to the second modification.

<Embodiment Effect>

According to the present embodiment, a reference core position necessary in elevator installation in an elevator shaft is automatically determined based on a comparison between specification values and portion dimension values calculated based on an automatic measurement result of a shape and a dimension of an inner wall of the elevator shaft, so that an elevator shaft reference core position in the elevator shaft can be safely and easily calculated in a short time without requirement for skills. Therefore, it is possible to improve efficiency of reference core position design which is difficult for those who are not skilled workers having skills or know-how and improve efficiency of a negotiation work with customers.

A shape or dimension measurement work of an inner wall of an elevator shaft is automated, so that a work technician can proceed with another work, and work efficiency of an overall elevator installation work can be improved. Further, the shape or dimension measurement work of an inner wall of an elevator shaft in the related art includes a work at a high place and is a dangerous work. In contrast, since many processings are automated according to the present embodiment, a work technician can be relieved from the dangerous work.

The invention is not limited to the embodiments described above, and includes various modifications. For example, the embodiments described above have been described in detail for easy understanding of the invention, and the invention is not necessarily limited to those including all configurations described above. A part of configurations of one embodiment can be replaced with configurations of another embodiment, and configurations of one embodiment can be added to configurations of another embodiment. A part of configurations of the embodiments may be added, deleted, or distributed in other configurations, or may be integrated or replaced with other configurations. Processings described in the embodiments may be appropriately distributed or integrated based on processing efficiency or implementation efficiency.

REFERENCE SIGN LIST 100 reference core position calculation device
101 measurement unit
102 device housing
103 substrate
104 distance sensor
104L laser beam
106 suspension hook
106a ring portion
108, 109 laser oscillator
108a, 109a laser beam
110 height sensor
111 power supply unit
112 calculation unit
113 control unit
115 rope
140 distance sensor
150 hoist machine
150a hoist drive unit
150b hoist drum
150c rope guide
150e encoder
151 drive power supply
160 terminal device
208 PSD
250 measurement point
250L primary straight line
255 measurement point
255L1, 255L2 approximate straight line
260 intersection point
300 plate
500 elevator shaft
500L elevator shaft bottom surface
500u elevator shaft top portion
505 elevator shaft wall
510 floor surface
510a return mark
510d exit and entrance opening
520d exit and entrance opening
530d exit and entrance opening
540d exit and entrance opening
600 return mark position
610 X axis
620 Y axis
700 return mark position jig
700a top portion
700b flat surface portion
700c ridgeline
700d ridgeline
710 return mark position jig
710, 720 return mark position jig
710a top portion
710c ridgeline
710d ridgeline
720 return mark position jig
720a top portion
720c ridgeline
720d ridgeline
1000 monitor screen
1010 display region
1010a display area
1010b display area
1010c reference core position change content display
1010d changed reference core position display

The invention claimed is:

1. A reference core position calculation device that calculates a reference core position of an elevator shaft in which an elevator is to be installed, the reference core position calculation device comprising:
a measurement unit that measures a dimension of each portion of the elevator shaft; and
a calculation unit that calculates portion dimension values of the elevator shaft based on the reference core position and the dimension of each portion measured by the measurement unit, wherein
when the reference core position is a first reference core position, the calculation unit determines whether portion dimension values of the elevator shaft calculated based on the first reference core position satisfy a predetermined specification, and
when the calculation unit determines that the portion dimension values of the elevator shaft calculated based on the first reference core position do not satisfy the predetermined specification, the calculation unit calculates a second reference core position which serves as the reference core position and at which portion dimension values of the elevator shaft satisfy the predetermined specification.

2. The reference core position calculation device according to claim 1, wherein
the calculation unit changes the reference core position from the first reference core position to the second reference core position, and calculates portion dimension values of the elevator shaft based on the second reference core position.

3. The reference core position calculation device according to claim 1, wherein
the portion dimension values of the elevator shaft are displayed on a display unit, and
a portion dimension value of the elevator shaft that is determined not satisfying the predetermined specification is displayed on the display unit in an identifiable manner.

4. The reference core position calculation device according to claim 1, wherein
the measurement unit includes a measurement device that measures a distance from a measurement center of the measurement unit to each portion of the elevator shaft by using light or sound, and
a dimension of each portion is measured by measuring the distance to each portion of the elevator shaft by the measurement device.

5. The reference core position calculation device according to claim 4, wherein
the measurement unit includes a rotary device that outputs the light or the sound onto a predetermined surface in any measurement direction when the measurement device measures the distance to each portion of the elevator shaft, and
the calculation unit calculates coordinate information of each portion of the elevator shaft based on the distance to each portion of the elevator shaft measured by the measurement device and angle information indicating each measurement direction of the rotary device.

6. The reference core position calculation device according to claim 5, wherein
the calculation unit
estimates a shape of an inner wall of the elevator shaft by approximating a plurality of coordinates by primary straight lines based on a plurality of pieces of coordinate information,
calculates an intersection point where the primary straight lines intersect with each other, and
calculates a distance from coordinates of the reference core position to the intersection point or each of the primary straight lines.

7. The reference core position calculation device according to claim 5, wherein
the measurement unit measures, with the measurement device and the rotary device, a distance from the measurement center of the measurement unit to each portion of a jig that is provided in a periphery of a predetermined reference position for elevator installation and includes a predetermined corner portion or a predetermined prism portion, and
the calculation unit calculates the predetermined reference position based on the distance to each portion of the jig measured by the measurement unit and the angle information indicating each measurement direction of the rotary device.

8. A reference core position calculation method executed by a reference core position calculation device that calculates a reference core position of an elevator shaft in which an elevator is to be installed, wherein
the reference core position calculation device
measures a dimension of each portion of the elevator shaft,
calculates portion dimension values of the elevator shaft based on the reference core position and the measured dimension of each portion, and
determines, when the reference core position is a first reference core position, whether portion dimension values of the elevator shaft calculated based on the first reference core position satisfy a predetermined specification, and
when the reference core position calculation device determines that the portion dimension values of the elevator shaft calculated based on the first reference core position do not satisfy the predetermined specification, the reference core position calculation device calculates a second reference core position which serves as the reference core position and at which portion dimension values of the elevator shaft satisfy the predetermined specification.

\* \* \* \* \*